Patented Jan. 13, 1925.

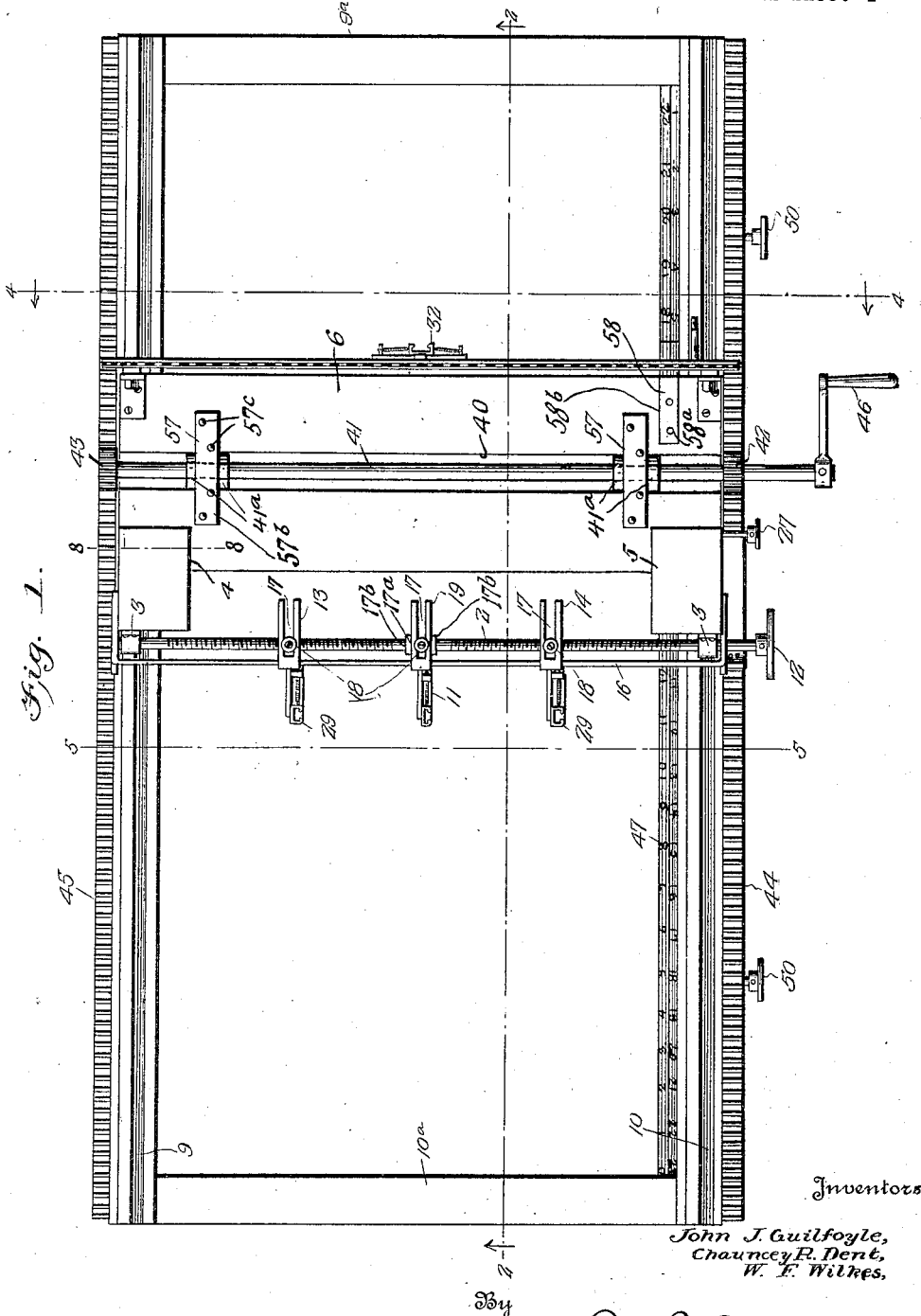

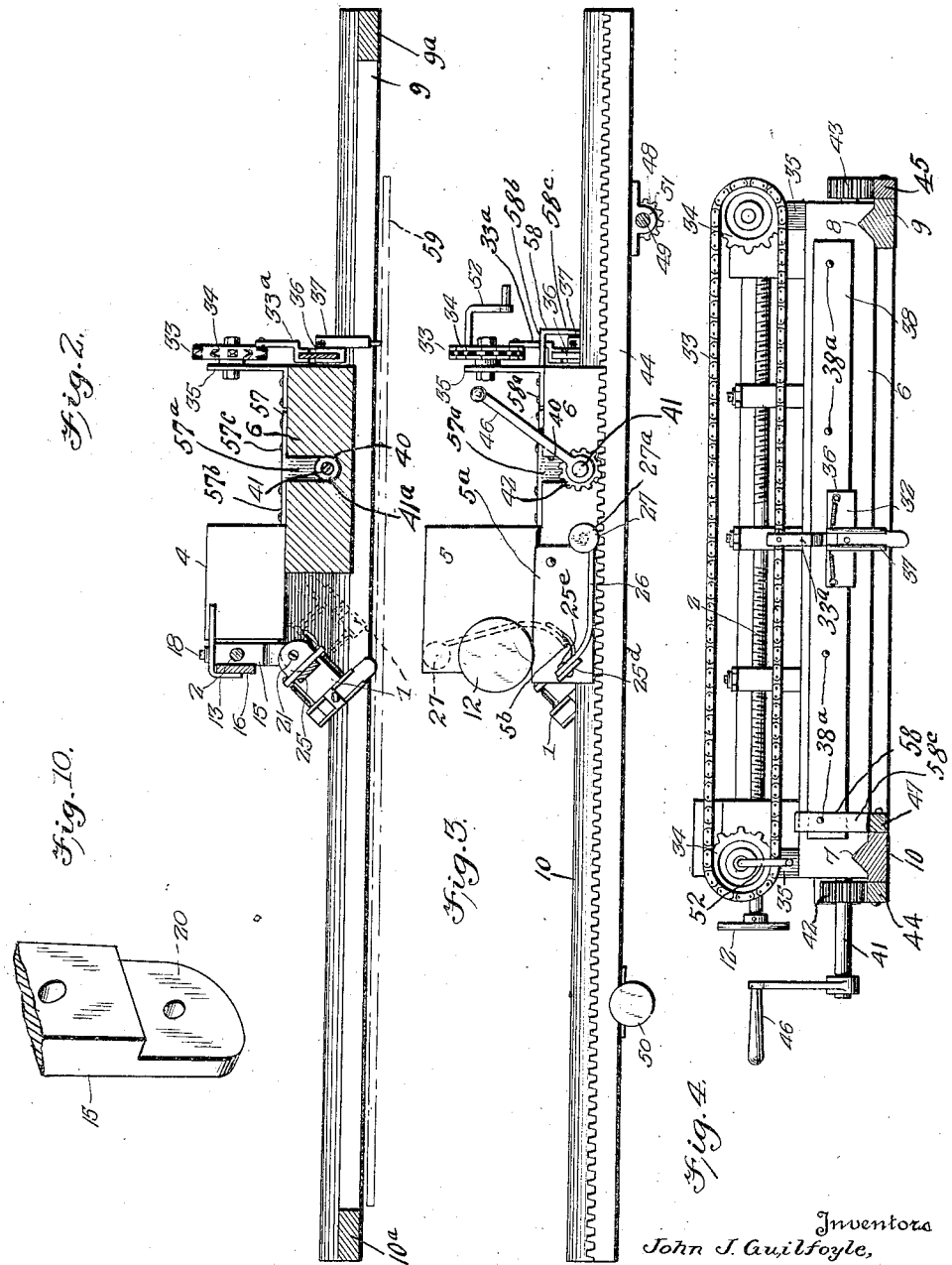

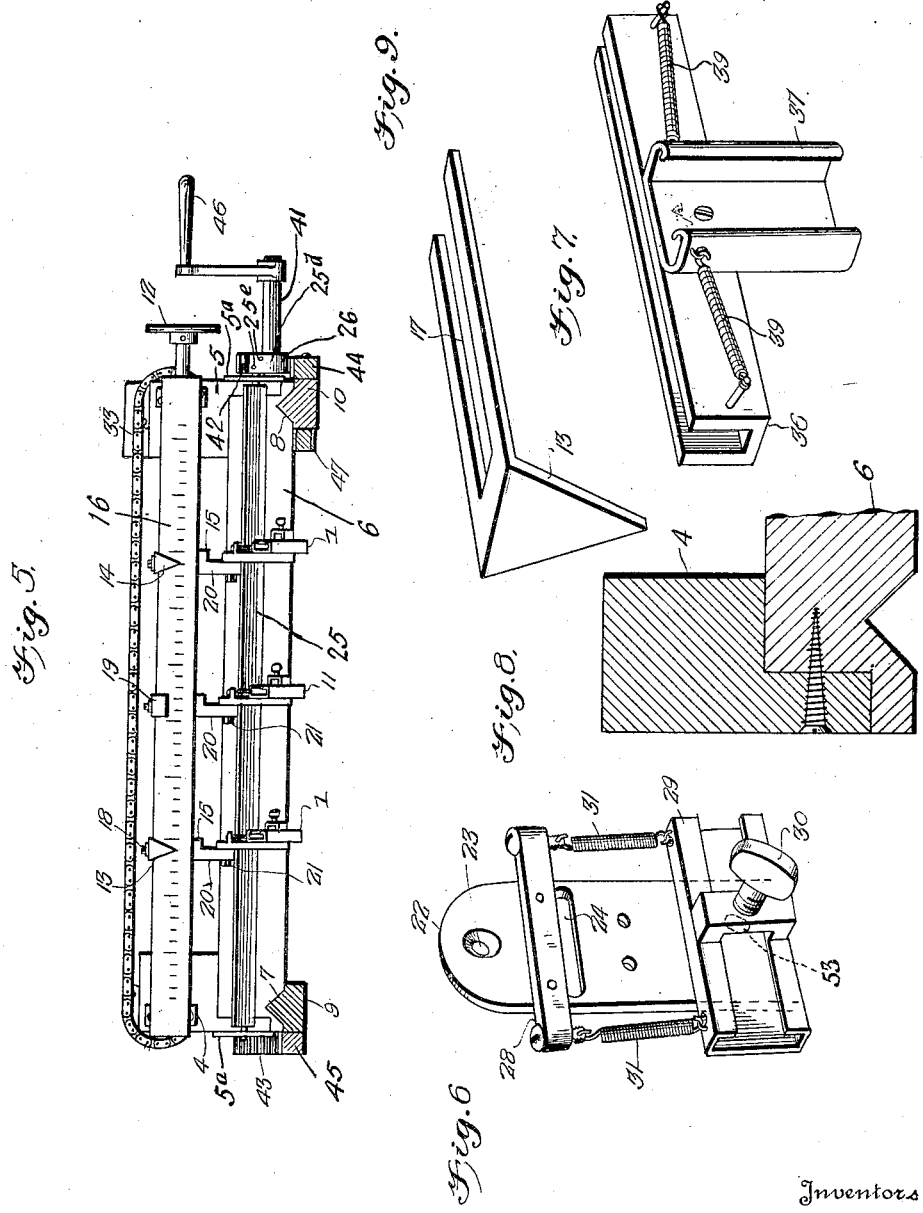

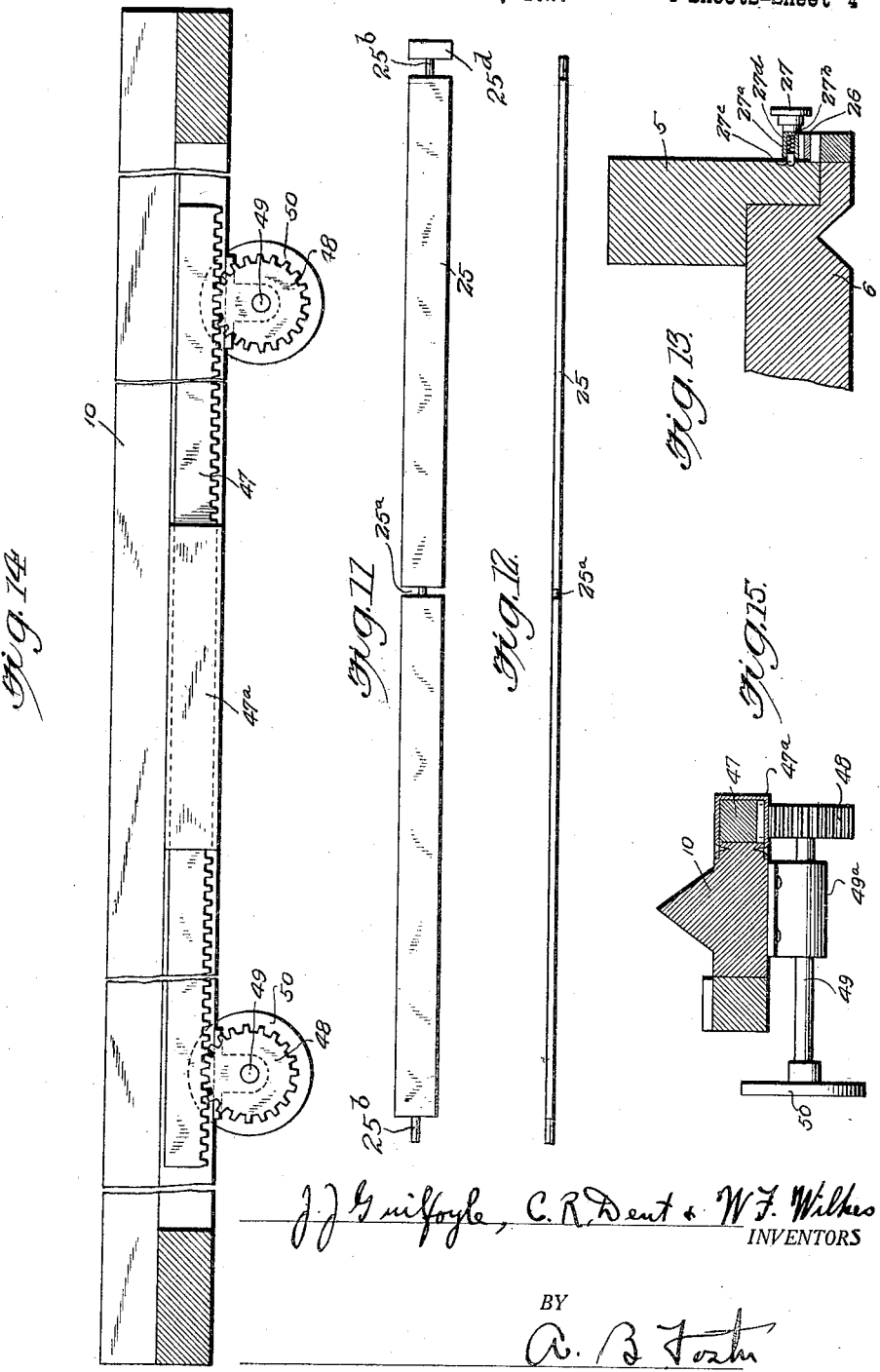

1,522,585

UNITED STATES PATENT OFFICE.

JOHN J. GUILFOYLE, CHAUNCEY R. DENT, AND WILLIAM F. WILKES, OF BIRMINGHAM, ALABAMA.

MARKING MACHINE.

Application filed October 15, 1920. Serial No. 417,273.

*To all whom it may concern:*

Be it known that we, JOHN J. GUILFOYLE, CHAUNCEY R. DENT, and WILLIAM F. WILKES, citizens of the United States, residing at Birmingham, in the county of Jefferson and State of Alabama, have invented certain new and useful Improvements in Marking Machines, of which the following is a specification.

Our invention relates to marking machines and has for its object the provision of a device simple in structure, adapted to economically, efficiently and accurately mark metal plates especially steel plates for shearing after being rolled and straightened.

In order that our invention may be clearly understood one embodiment thereof is illustrated in the accompanying drawings in which:

Fig. 1 is a plan view;
Fig. 2 is a section on line 2—2 of Fig. 1;
Fig. 3 is a side elevation;
Fig. 4 is a combined back elevation and section, the latter being taken along the line 4—4 of Fig. 1.
Fig. 5 is a combined front elevation and section, the latter being taken along the line 5—5 of Fig. 1.
Fig. 6 is a perspective view of a chuck or holder adapted to carry and operate one of the longitudinal pencils.
Fig. 7 is a perspective view of the chuck or holder carrying a transverse marking pencil.
Fig. 8 is a section taken along 8—8 of Fig. 1.
Fig. 9 is a perspective view of an indicator.
Fig. 10 is a detail of the connection between an indicator and its corresponding chuck.
Fig. 11 is a plan view of the oscillating bar. Fig. 12 is a side view thereof. Fig. 13 is a detail showing the means for holding the lever 26 in place. Fig. 14 is a side view of the auxiliary carriage. Fig. 15 is a detail thereof, partly in cross section.

The machine comprises a series of chucks 1 movably mounted on a right and left hand screw 2, journaled in bearings 3, secured to supports 4 and 5, which are in turn attached to the member 6, which is triangularly slotted at 7 and 8, as shown in Figs. 4 and 5, so as to enable the same to ride smoothly on rails 10 and 9, which are held in parallel relation by the cross-pieces 9$^a$ and 10$^a$, the rails and cross-pieces forming the frame upon which the main and transverse carriages are mounted. Attached to the screw 2 is a stationary center chuck 11. The chuck 11 has no lateral movement, as it is for the purpose of marking a central line whenever three longitudinal lines are marked. Chuck 11 has its bearing on a turn journal 17$^a$, at the center of the right and left hand-screw 2, and is secured in place by set collars 17$^b$ at each side thereof. The screw 2 is provided with a knob 12, to facilitate manual operation of the screw.

The movable pointers 13 and 14 and the fixed center indicator 19, the latter stationary relative to bar 16, are attached to their respective chucks by a connection-member 15, the movable pointers traveling along the bar 16, simultaneously with the corresponding chucks, the said bar being graduated in inches in both directions from zero at the center. The pointers 13 and 14 and the center indicator 19, slotted at 17, to facilitate the adjustment thereof, are secured to the connection-members 15 by screws 18. The chucks 1 and 11 are pivotally secured to the lower portion 20 of the connection-member 15 by means of bolts 21. The bar 16 is mounted on the supports 4 and 5.

As shown in Fig. 6 the chucks 1 and 11 comprise an elongated body-portion 22, apertured at 23 and 24, respectively, the former to carry the bolts 21 and the latter to receive the oscillating bar 25, operated by the hand lever 26, to which is secured the knob 27. The elongated body-portion 22 carries transverse members 28 and 29 the latter being in the shape of a channel to effectively retain the longitudinal marking pencils which are securely held in place by the thumb-crews 30. The bar 28 is rigidly secured to the body-portion 22, and the member 29 swings on a pivot 53, at the center of its channel. The pivot 53, flush with the bottom of transverse member 29, extends through the lower portion of the elongated member 22, and allows a pencil to be placed in member 29, and held securely by thumb screws 30. The transverse members are connected by tension springs 31, which hold the marking pencils securely against the plate to be marked. One spring functions when marking in one direction and the other on marking in the opposite direction. The two tension springs 31 assure of an even tension being brought to bear on the pencil so that it will mark a continuous line free from breaks in continuity that might be caused by irregularities or raised areas in the surface of the steel plate as the pencil moves over said surface in marking the steel plate for shearing.

As shown in Figure 6, it will be noted that just beneath the cross-member 28, in the upright 22, is a transverse slot 24. This slot 24 is used in connection with an oscillating bar 25, as shown in Figure 2. As plainly shown in Figs. 2 and 3, the bar 25 extends across from support 4 to support 5. The bar 25 is journaled at 25$^b$ as shown in Figure 11 and the journals rest in brackets 5$^a$ having crescent-shaped slots 5$^b$, thereby allowing said bar 25 to oscillate from a position in which it and the chucks form an angle of 45 degrees with the vertical, so as to hold the pencils in one position for marking lines in one direction to a position in which the bar 25 and the chucks form an angle of 45° with the vertical to hold the pencils in an opposite position for marking lines in the opposite direction. The oscillating bar 25 is attached to and is operated by lever 26. The journal 25$^b$ which extends through the crescent shaped slot 5$^b$ has a journal-plate 25$^d$, of the same dimensions as the bar 25 to which the lever 26 is attached by means of screws or rivets 25$^e$. The journals 25$^a$ and 25$^b$ are each of sufficient length to allow the bar 25 to have a lateral movement sufficient to permit the bar to engage or disengage chuck 11 by simply pulling the lever 26 by means of hand-knob 27 either toward or away from the operator, thereby allowing chucks 1 to mark two longitudinal lines only when steel plates of more extended width are desired. The oscillating bar itself passes through the slot 24, in member 22 of each of the three chucks or holders 1 and 11 respectively, as shown in Figure 2, where chuck or holder 1 is shown in its position for marking a line in one direction while its position for marking the line in the opposite direction is shown in phantom. Knob 27 has a hub 27$^a$, which carries a recess 27$^b$ through its center; said recess contains a pin 27$^c$ that is operated by a coil spring 27$^d$, so that the pin will engage the holes that are placed in the member 5 when the lever 26 is in either the horizontal or the vertical position. In Figure 3, the above described pin is shown in its hole for securing the lever 26 in its horizontal position, while the same figure shows in phantom the position of the lever 26 as it would be when the pin was placed in its hole for holding the lever in its vertical position.

The transverse marking chuck 32 which number is used to designate the chuck as an entity is fixedly secured by means of arm 33$^a$ to the endless sprocket chain 33, operating on the sprockets 34, carried by brackets 35 fixed on the supporting member 6. The transverse chuck 32 consists of a guide-sleeve 36 and a marking-pencil-retainer 37, the former sliding along the guide bar 38 on movement of the chain 33 and crank 52. The retainer 37 is pivotally connected to the guide member 36 and guide bar 38, the lattter being secured to member 6 by means of screws 38$^a$. The tension springs 39 permit effective contact of the marking pencils with the plate to be marked. The means for operating the transverse chuck, as described above, constitute the transverse carriage. The longitudinal marking chucks 1 and 11 and the transverse marking chuck 32 are adapted to hold marking pencils for marking the plate 59 which is delineated in Figure 2 beneath the rail 9. The pencils in the longitudinal chucks mark the plate 59, as the main carriage travels lengthwise of the rails. When it is desired to strike a transverse line at right angles to those already marked the transverse carriage carrying the chuck 32 is brought into action.

The support 6, is grooved at 40, forming a channel which is U-shaped and extends across the support 6 from rail 9 to rail 10. In this channel 40, at each end are hung one of a pair of bearings 57, each comprising a right-angled angle iron with vertical straps 57$^a$ and horizontal straps 57$^b$. The horizontal straps are attached to the surface of the member 6 by screws 57$^c$. In the bearings 57 which rest on the floor of the groove 40 is suspended the shaft 41. The shaft 41 is held in place and secured against lateral movement by means of set collars 41$^a$ attached to the shaft 46, and placed on either side of each bearing.

On the inside of the carriage-frame, attached to the inside of the rail 10, is a graduated rack 47, co-operating with the pinions 48, which are keyed to the shafts 49, carrying handles 50. The rack is planed to provide a smooth upper surface for a double graduated scale. This smooth surface is divided into two lateral halves by a straight line extending through its center from end to end. At the opposite ends of each lateral half of the divided surface a zero mark is placed and from each zero mark each lateral half is graduated in inches and fractions of an inch, in opposite directions, and in this way, if the rack is graduated for, say, 500 inches, the 500-inch graduation mark on one side of the dividing line will be even with the zero mark on the opposite side of said line, thus providing a graduated rack for measuring from either end of said rack. The rack 47, bearing the double graduated scale described, slides freely in bracket 47$^a$, which is fastened on the inside of rail 10. The rack is supported and operated by pinions 48, keyed to shaft 49. Any number of pinions, having the same pitch as that of 48, may be placed beneath the rack if they are found necessary to prevent sagging of the rack at its center. The hand-knobs 50, one of which is placed near each end of the rail 10, are for the purpose of operating the rack 47 from either end of the machine.

To work in co-operation with the rack 47 is a L-shaped indicator 58, shown in Figs. 3 and 4, which is attached to the base of the carriage 6, by screws 58$^a$ and is in perfect alignment with the pencil for marking transverse lines. From its point of attachment at the base of the carriage 6, the indicator 58 has an outwardly extending portion 58$^b$ and a downwardly extending portion 58$^c$ with a square end, just clearing rack 47, thus engaging perfectly the graduations on rack 47, for the purpose of spacing the transverse lines on the steel plates to pre-determine their length when sheared. The shafts 49 are carried in bearings 51. The rack 47 with its cooperating members is used to get the first line marked on the plate. After the plate has been conveyed to a certain point, instead of further moving the plate, the frame is moved by means of the rack 47.

The operation of our machine is as follows:

The machine provided by the present invention is to be operated for the purpose of marking lines on the upper surface of steel plates or other metal plates so that the surface will be laid off with corners that are perfectly square, said lines indicating the place to be sheared.

Metal and steel plates when they come from the rolling-mill have level surfaces but the end edges are not parallel to each other. The side edges are not parallel to each other at all points. The end-edges and side-edges also are not at perfect right angles to each other. Such plates must first be marked and then sheared to form perfect plates, and often the plates must be marked into sections and sheared to form smaller perfect plates for the trade.

When the marking machine, as previously described, is set up ready for operative use the rails 10 and 9, which may be of any desired length, and in sections that make them easy to handle, are bolted to a suitable foundation, and when thus mounted the end pieces 10$^a$ and 9$^a$ may be discarded. The main carriage, carrying every one of its assembled members including the second carriage, is mounted on these rails with the inverted -V- shaped grooves of the member 6 engaging the inverted -V- shaped portions of the rails and the pinions 42 and 43 engaging the racks 44 and 45. The machine is then ready for marking lines and laying off plates for shearing.

A metal plate is then rolled into position underneath the lower surface of the member 6 of the main-carriage, between the rails 10 and 9, and allowed to rest in place upon the rollers, which same roll in between the rails and on the upper surface of the foundation supporting the rails in parallel relationship, the rails being of sufficient height to allow the same.

The first act of the operator is to turn one of the hand-knobs 50 and thereby shift the rack 47 just enough to bring the zero-mark of its one graduated scale to a point, at the end of the plate, such that if a transverse line were struck across said plate at said point it would be straight and continuous across the full width of the plate; the next step is to turn the crank 46 and bring the main-carriage towards this end of the plate until the indicator 58 engages the zero-mark of the graduated scale on the rack 47. If three longitudinal lines are to be marked to lay off the surface of plate into two sections lengthwise, and if said sections are to be, for example 20 inches wide, the operator next turns the hand-knob 12 and moves the two lateral chucks 1, their pencils, and indicators 13 and 14 respectively, until said indicators each engage the numeral 20 on the graduated bar 16, while the center indicator 19 is allowed to engage the zero-mark and its chuck 11 and pencil is midway between the lateral chucks 1. Thereafter the operator manipulates the lever 26 to operate the oscillating bar 25 which is now engaging all three chucks, and by so doing swings the series of chucks and their pencils into the proper position for them to mark parallel lines, 20 inches apart, in the direction in which the main carriage is to travel in its first journey down the rails. However, if only two parallel longitudinal lines are to be marked or, if the width of the surface is to be marked by a pair of parallel longitudinal lines near its side edges, that is, if a plate, for example, 10 inches wide is to be marked for, then the lateral chucks 1 are brought in until their indicators 13 and 14 engage the numeral 5 to each side of the zero-mark. If the surface is to be marked for shearing by two parallel longitudinal lines to give a plate for example, 100 inches wide, then the lateral indicators 13 and 14 are moved outward until they engage the numeral 50 on the bar 16. In the first instance, the chucks that do the marking are 10 inches apart, while in the latter case the chucks are 100 inches apart. The first operation of the oscillating bar 25 is to shift lengthwise of itself just enough to cause it to disengage the central chuck 11, and allow this chuck to swing out of alignment with the other chucks and out of control of the bar. In either case, that is, if either two or three lines are to be marked, the bar 25 oscillates the chucks to be employed in marking and their pencils in the proper position for marking in the direction in which the main-carriage is to travel, while said bar, in turn, is secured in its position, by the lever 26 and knob 27 with its mechanism for keeping the pin 27e forced home in its hole.

This section of the machine is now adjusted for marking the longitudinal lines. However, before the carriage is started on its journey down the rails 9 and 10 the operator turns the crank 52 and operates the second carriage that carries the single chuck 32 and pencil thereby striking the first transverse line across the plate from one edge to the opposite edge, said line being even with the zero-mark of the graduated scale 47. The machine is then in a position to strike the longitudinal lines. If the plates are to be laid off in 500 inch lengths, the operator travels the carriage towards the transverse line already marked until the series of chucks 1 and 11 and their pencils are at said line. Thereafter the operator travels the carriage in the opposite direction toward the other end of the rails 9 and 10, the series of pencils striking their lines until said pencils are even with or in line with the 500 inch graduation-mark. When they have reached this line the bar 25 is swung loose in its bearings by disengaging the lever 26 and knob 27, and the series of chucks 1 and 11 are swung to a neutral position in which their pencils do not touch the plate. With the pencils swinging free the carriage is traveled a short distance farther until the indicator 58 engages the 500 inch mark mentioned, when the carriage now comes to rest and the operator again operates the second carriage to strike the second transverse line across the plate from one edge to the other. This portion of the plate is now marked ready for shearing and is laid off by longitudinal lines and transverse lines, the first being parallel to each other and at perfect right-angles to the latter, and the latter being parallel to each other and at right-angles to the former.

After this first operation of the machine if there remains a portion of the surface unmarked and it is desired to mark same, all that is necessary is for the operator to travel his main carriage backward until the series of pencils are at the last transverse line marked and then operate the lever and throw the chucks back into position with their pencils in contact with the surface and again travel his carriage on down the rails and mark other longitudinal lines of length desired to mark the second section of the plate and again operate the second carriage to strike a third transverse line.

The machine, if operated, as described may be employed to mark a very long and very wide plate for shearing to form narrow long plates, narrow short plates, long wide plates and square plates.

We claim:

1. In a marking machine, the combination of an elongated frame, a main carriage supported on and movable longitudinally of said frame and having mounted thereon chucks carrying marking pencils, means for moving said chucks transversely of the frame in opposite directions to properly space the chucks, and a second carriage supported by and movable transversely of said frame.

2. In a marking machine, the combination of an elongated frame, a main carriage supported on and movable longitudinally of said frame and having mounted thereon chucks carrying pencils to mark longitudinal lines, a right-and-left-handed screw mounted on said carriage for moving the chucks transversely in opposite directions to properly space the same, and a second carriage supported by and movable transversely of said frame and carrying a pencil to mark transverse lines.

3. In a marking machine, the combination of an elongated frame, a main carriage supported on and movable longitudinally of said frame and having mounted thereon chucks carrying pencils to mark longitudinal lines, means mounted on said carriage for moving the chucks transversely in opposite directions, means for oscillating the pencils to adapt them to mark in either direction, and a second carriage supported by and movable transversely of said frame and carrying a pencil to mark transverse lines.

4. In a marking machine, the combination of an elongated frame, a main carriage supported on and movable longitudinally of said frame and having mounted thereon position-pointers, chucks carrying marking pencils, a connection-member between the pointers and the chucks, means mounted on said carriage for moving the latter and connected pointers in opposite directions to space the elements moved, and a second carriage supported by and movable transversely of said frame and carrying a marking pencil to mark transverse lines.

5. In a marking machine, the combination of an elongated frame, a main carriage supported on and movable longitudinally of said frame and having mounted thereon position-pointers, a graduated bar across which the latter move, chucks mounted on said carriage carrying longitudinal marking pencils, a connection-member between the pointers and the chucks, means for moving the latter and connected pointers in opposite directions to space the elements moved, means for oscillating the pencils to adapt them to mark in either directions and a second carriage supported by and movable transversely of said frame and carrying a pencil to mark transverse lines.

6. In a marking machine, the combination of an elongated frame, a main carriage supported on and movable longitudinally of said frame and having mounted thereon chucks carrying pencils to mark longitudinally, a second carriage supported by and movable transversely of said frame and carrying a pencil to mark transverse lines, and means for moving the second carriage transversely.

7. In a marking machine, the combination of an elongated frame, a main carriage supported on and movable longitudinally of said frame and having mounted thereon position-pointers, a graduated bar across which the latter move, chucks mounted on said carriage carrying longitudinal pencils to mark longitudinal lines, a connection-member between the pointers and the chucks, means for moving the latter and connected pointers in opposite directions to space the elements moved, means for oscillating the pencils to adapt them to mark in either direction, means carried by said frame for moving the main carriage longitudinally, a second carriage supported by and movable transversely of said frame and carrying a pencil to mark transverse lines, and means for moving the second carriage transversely.

8. In a marking machine, a carriage comprising a chain, gears co-operating with said chain to move the same, supports for said gears, a guide-bar, a chuck fixedly attached to said chain and slidably mounted on said guide-bar, and a pencil carried by said chuck.

9. In a marking machine, a supporting frame, a carriage mounted thereon, means for moving the carriage, a guide-bar, a chuck fixedly attached to said means and slidably mounted on said guide-bar, and a pencil carried by said chuck.

10. In a marking machine, a chuck comprising an elongated body-portion, an upper member, a lower member carrying a plate-marking pencil, resilient means connecting said upper and lower members to hold the pencil in effective contact with the plate, and means for holding the pencil securely in said lower member.

11. In a machine for marking plates, a chuck comprising an elongated slotted body portion, an upper member, a lower channel-shaped member mounted on said body portion, a pencil carried by the latter and adapted to mark longitudinal lines on a plate, resilient means connecting said upper and lower members to hold the pencil in effective contact with the plate, and means for holding the pencil securely in said lower member.

12. In a marking machine, the combination of elongated frame having side members, racks carried thereby, pinions cooperating with said racks, a grooved support mounted on said side members, a pinion shaft bearing in the grooved support and carrying the pinions cooperating with said racks, a series of longitudinal chucks actuated by said racks and pinions, said elements constituting a main carriage; a transverse marking pencil mounted on the grooved support, and an inverted rack secured to the inner side of one of the side members, adapted to cooperate with pinions secured to the lower surface of the same side member, the inverted rack having on its upper surface a pair of graduated scales, parallel to each other and graduated in opposite directions, to predetermine the various points along the length of said side members at which the main carriage, provided with an indicator shall come to rest in its journey lengthwise of the side members, to bring the transverse marking pencil to proper position to adapt it to mark at right angles to said side members.

13. In a marking machine, the combination of a frame, a main carriage, position-pointers carried thereby, a graduated bar across which they move, chucks mounted on said carriage carrying longitudinal marking pencils, a connection-member between the pointers and the chucks, means for moving said chucks and connected pointers in opposite directions to space the elements moved, means for oscillating the pencils to adapt them to mark in either direction; a second carriage supported by and movable transversely of said frame, a marking pencil carried thereby and an inverted rack carried by said frame having on its upper surface a pair of graduate scales parallel to each other and graduated in opposite directions to predetermine when the main carriage shall come to rest in order that the marking pencil of the second carriage may strike a line at right angle to the longitudinal lines.

In testimony whereof we affix our signatures.

JOHN J. GUILFOYLE.
CHAUNCEY R. DENT.
WILLIAM F. WILKES.